D. C. STOVER.
Reel for Coiling Wire-Rods.
No. 219,124. Patented Sept. 2, 1879.
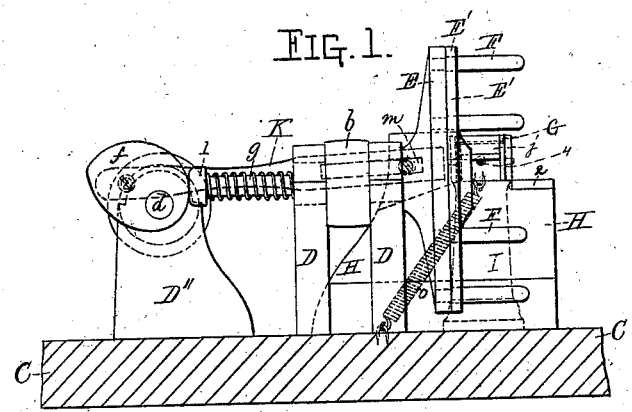
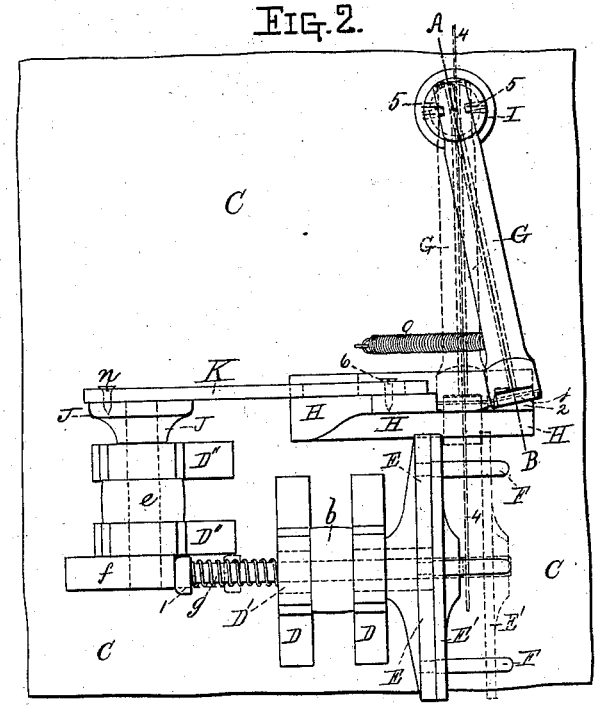
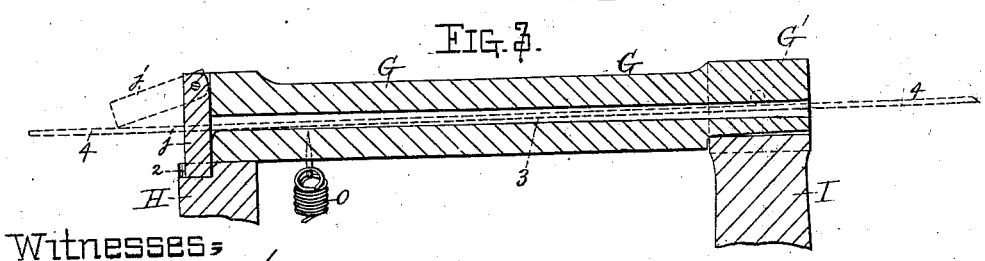
Witnesses:
Edwin E. Moore
Albert A. Barker,
Inventor:
Daniel C. Stover

UNITED STATES PATENT OFFICE.

DANIEL C. STOVER, OF FREEPORT, ILLINOIS, ASSIGNOR TO WASHBURN & MOEN MANUFACTURING COMPANY, OF WORCESTER, MASSACHUSETTS.

IMPROVEMENT IN REELS FOR COILING WIRE RODS.

Specification forming part of Letters Patent No. 219,124, dated September 2, 1879; application filed February 24, 1879.

*To all whom it may concern:*

Be it known that I, DANIEL C. STOVER, of the city of Freeport, in the county of Stephenson and State of Illinois, have invented certain new and useful Improvements in Automatic Reels for Coiling Wire Rods; and I do hereby declare that the following is a full, clear, and exact description of the same, reference being had to the accompanying drawings, forming a part of this specification, and in which—

Figure 1 represents a rear end view of my said improved automatic reel. Fig. 2 represents a top or plan view; and Fig. 3 represents a central longitudinal section through the rod-guiding arm on line A B, Fig. 2, as will be more fully explained hereinafter.

To enable those skilled in the art to which my invention belongs to make and use the same, I will proceed to describe it more in detail.

In the drawings, the part marked C represents the flooring or base upon which the reel is arranged and secured. The parts marked D represent the standards which support the bearings of the tubular shaft D' of the coiling-reel E, as indicated by dotted lines, Fig. 2.

Reel E is revolved by means of a belt passing around the driving-pulley b, secured fast upon the tubular shaft D'.

The standards D'' support the bearings of a shaft, d. (Represented in dotted lines, Fig. 2, and full lines, Fig. 1.) This shaft d is rotated by a belt passing around its pulley e. Upon one end of shaft d is secured a cam, f, which cam, when shaft d is revolved, strikes against the enlarged end 1 of a movable spindle, g, which passes through the tubular shaft D', and carries on its outer end a rod-discharging disk or head, E', which is provided with holes for the passage of the reel-arms F, upon which the rod is coiled or wound as it is finished, and passes through the rod-guiding arm G, as will be hereinafter more fully described.

The rod-guide arm G is provided with a hole or opening, 3, passing through its entire length, as fully indicated in Fig. 3 of the drawings, for the passage of the finished rod 4. The front end G' of rod-guide arm G is hinged or pivoted between ear-pieces 5 5 on the upper end of the swivel-standard I, which is so secured to the base C or otherwise constructed so that it can turn to permit rod-guide arm G to swing back and forth to a certain extent, for the purpose of allowing its rear end to occupy the positions shown in full and dotted lines, Fig. 2 of the drawings.

The hinged connection of the front end of rod-guide arm G is of such a character as to allow its rear end to rise and fall, for the purpose of permitting the stop lid or dog j to drop into slot or recess 2 when the rear part of the guide-arm is swung out into the position shown in full lines, Figs. 2 and 3 of the drawings.

One end of a spring, o, is secured to the rear end of arm G, while the other end of spring o is secured to base C in such a manner that its contracting force will draw the rear end of arm G into the position shown in dotted lines, Fig. 2, whenever and as soon as the lid or dog j is forced out of slot 2, as indicated in dotted lines, Fig. 3.

The operation of my improved reel for coiling or winding steel rods as they are delivered from the finishing-rolls of the rolling-mill is as follows: The arrangement of the reel being such that the hole or opening 3 at the front end of rod-guide arm G will be on or nearly on a line with the groove through which the finished rod passes from the mill, the end of the rod is passed into hole or opening 3, (and said opening may be made with a trumpet-shaped mouth for convenience,) and passes through and strikes against lid or dog j, throwing it out of slot or recess 2, thereby permitting spring o to suddenly draw the front end of arm G into position shown in dotted lines, Fig. 2, thus bringing the end of the rod 4 directly within the action of the reel-arms F, as indicated in dotted lines, Fig. 2, and as reel E and its arms F are being rotated the rod is carried up and around upon reel-arms F until the coil is completed, after which the attendant puts into motion pulley e, thus causing cam f to strike against enlarged end 1 of spindle g, and forcing it forward together with disk or head E' to the position shown in dotted lines, Fig. 2, thereby discharging the coil from the arms F of the reel E, said coil dropping upon the floor or into a receptacle, car, or truck provided to receive it.

By the same motion of shaft $d$ which throws spindle-arm $g$ forward to discharge the coil-rod, a wheel, J, fast on shaft $d$, carrying a wrist or crank pin, $n$, is rotated, and gives motion to an eccentric-lever, K, one end of which is fitted to wrist-pin $n$, while the other end is provided with a slot, $m$, by which it is guided by means of a stationary guide pin or screw, 6, so that when it is moved forward by rotation of shaft $d$ it will force rod-guide arm G into its original position, (shown in full lines, Figs. 2 and 3.) with the lid or dog $j$ dropped into slot or recess 2, thereby leaving the parts in proper position for commencing the coiling of another rod, as before explained.

Those skilled in the art will readily understand and appreciate the great practical advantages of my improved reel, since the operation of securing the end of the rod to the reel-arms with certainty is performed by mechanical means, and therefore the dangerous operation of securing the same by the hand of the operator by means of a pair of pinchers is obviated, while at the same time much labor is saved and great expedition is attained in the rolling and coiling operation.

It will be observed that as the rod passes through arm G with considerable rapidity it will have extended beyond the arm to a considerable distance by the time it is thrown or drawn within the action of the reel-arms; consequently there is no danger or liability of its being thrown back and out of the action of the reel-arms.

Having described my improved reel for coiling wire and steel rods, what I claim therein as new and of my invention, and desire to secure by Letters Patent, is—

1. The swinging rod-guide arm G, to which is hinged the lid or dog $j$, with the reel E, substantially as and for the purpose set forth.

2. The combination, with guide-rod arm G, to which is hinged the lid or dog $j$, and slotted stand H, of eccentric-wheel J and eccentric-lever K, substantially as and for the purpose set forth.

DANIEL C. STOVER.

Witnesses:
 EDWIN E. MOORE,
 ALBERT A. BARKER.